United States Patent [19]

Johns

[11] Patent Number: 5,055,747

[45] Date of Patent: Oct. 8, 1991

[54] SELF-REGULATING, NO LOAD PROTECTED ELECTRONIC BALLAST SYSTEM

[75] Inventor: Douglas A. Johns, West Palm Beach, Fla.

[73] Assignee: Intent Patents A.G., Yaduz, Liechtenstein

[21] Appl. No.: 554,909

[22] Filed: Jul. 20, 1990

[51] Int. Cl.$^5$ .............................................. H50B 41/36
[52] U.S. Cl. .................................. 315/307; 315/224; 315/287; 315/221; 363/19
[58] Field of Search ............... 315/307, 224, 287, 278, 315/221; 363/19, 21, 37, 41, 55

[56] References Cited

U.S. PATENT DOCUMENTS

| | | | |
|---|---|---|---|
| 4,503,362 | 3/1985 | Hanlet | 315/224 |
| 4,587,461 | 5/1986 | Hanlet | 315/224 |
| 4,733,135 | 3/1988 | Hanlet | 315/224 |
| 4,933,612 | 6/1990 | Bonin | 315/307 |

Primary Examiner—Eugene R. LaRoche
Assistant Examiner—Tan Dinh
Attorney, Agent, or Firm—Morton J. Rosenberg; David I. Klein

[57] ABSTRACT

An improved self-regulating, no load protected electronic ballast system (10) is coupled to a power source (12) for actuating at least one gas discharge tube (b 66) with a regulated current and limited voltage to maintain the gas discharge tube (66) input and output power at a predetermined value. The improved ballast system (10) includes a filter circuit (11) coupled through a rectification circuit (16) to the power source (12) to provide a filtered output (28). The output line (28) is coupled to a first toroidal transformer winding (58) of self-regulating circuit (17) for monitoring the regulated current coupled to induction circuit (15). The induction circuit (15) includes a primary winding (42) tapped to provide an autotransformer configuration for establishing the magnitude of the regulated current. The induction circuit (15) includes a trigger control winding (48) for generating a control current and further includes a no load protection circuit (99) for generating a voltage across the gas discharge tube (66) responsive to the regulated current and for maintaining the output voltage at a predetermined value when the gas discharge tube (66) is decoupled from the electronic ballast system (10). No load protection circuit (99) includes a tuned secondary winding (160) coupled in parallel relation with a tuning capacitor (132) and the gas discharge tube (66). A pair of stabilizing capacitors (134, 136) are each coupled across a respective one lead of each of a pair of filaments (68, 70) of gas discharge tube (66).

20 Claims, 1 Drawing Sheet

SELF-REGULATING, NO LOAD PROTECTED ELECTRONIC BALLAST SYSTEM

BACKGROUND OF THE INVENTION

1. Field of the Invention

This invention is directed to an electronic ballast system for fluorescent or gas discharge tubes. In particular, this invention relates to automatic gain controlled ballast systems for fluorescent tubes. Still further, this invention is directed to an electronic ballast system which limits the voltage output to fluorescent gas discharge tubes when the output voltage of the power source increases. The output voltage of the electronic ballast system is also substantially reduced when the gas discharge tube or fluorescent tube is electrically removed from the overall circuit. More in particular, this invention pertains to a no load protection transformer being series coupled to an induction circuit for preventing the generation of voltages above a predetermined value when the gas discharge or fluorescent tube is electrically removed from the circuit. More in particular, this invention relates to an electronic ballast system where a primary winding of a no load protection transformer forms a variable inductance which is inversely proportional to the magnitude of the power delivered to the gas discharge or fluorescent tube. Power is delivered to the gas discharge tube from a center tapped high voltage secondary winding wherein the center tap is capacitively coupled to the power supply reference. Thus providing DC isolation for the secondary circuit while providing an AC coupling to the power supply reference.

Still further, this invention directs itself to a transistor switching mechanism which is feedback coupled to an induction circuit for establishing a regulated current for a gas discharge tube independent of the gain of a transistor used in a particular ballast system unit. Additionally, this invention pertains to an electronic ballast system where there is provided a transistor switching network including a regulation control circuit for maintaining the power output of a gas discharge or fluorescent tube at a predetermined and substantially constant value. The regulation control circuit being coupled in series relation between the DC power supply and the no load protection transformer for monitoring the regulated current without being affected by various noise signals which may be superimposed on the regulated current by the no load protection transformer.

Further, this invention directs itself to an electronic ballast system having a regulation control circuit including a toroidal transformer to provide a predetermined variable inductance for regulating a power output to the gas discharge or fluorescent tube. Still further, this invention relates to an electronic ballast system which is transistorized and where the current gain of various transistors range over a wide value range from one system unit to another and provides for electrical circuitry which will maintain the gas discharge tube light output fluctuation to a minimum tolerance value.

2. Prior Art

Electronic ballast systems for gas discharge or fluorescent tubes are well-known in the art. The best known prior art to the Applicant includes U.S. Pat. Nos. 4,733,135; 4,587,461; 4,503,362; 4,277,726; 4,259,616; 4,075,476; 3,878,431; 3,638,070; 3,619,713; 3,222,572; and, 4,353,009.

With the exception of those prior art systems commonly owned by the Assignee, removal of gas discharge or fluorescent tubes from the ballast circuit causes excessive voltage outputs to be generated at the output terminals. This condition can have a deleterious effect to the operating life of the particular ballast system.

In some prior art systems, such as provided in U.S. Pat. No. 4,733,135, the self-regulation circuitry is coupled between the no load protection transformer and the induction transformer for monitoring the current therethrough. However, the high voltage high frequency signal induced in the secondary of these no load protection transformers tends to reflect transient current pulses into the primary winding wherein it becomes superimposed on the regulated current signal. Thus, in such prior art systems the self-regulating control circuitry attempts to control the base current for the switching transistor in response to the instantaneous additive signal formed by the regulated current and the transient noise. Further, in these prior art systems a DC component of the gas discharge excitation current is coupled to the power supply reference, which adds a second source for noise signals to be introduced into the ballast system.

The instant invention overcomes these deficiencies by monitoring the regulated current prior to its passage through the no load protection transformer circuit and provides a no load protection circuit having a center tapped secondary high voltage output winding capacitively coupled to the power supply reference to isolate the DC component while still establishing an AC reference.

SUMMARY OF THE INVENTION

A self-regulating, no load protected electronic ballast system having a power source for actuating at least one gas discharge tube with a regulated current and limited voltage to maintain the gas discharge tube input and output power at predetermined values is provided. The electronic ballast system includes a filter circuit connected to the power source for maintaining a substantially smooth direct current voltage signal relative to a power supply reference. Additionally, the ballast system includes an induction circuit coupled to the filtered circuit having a tapped primary winding providing an autotransformer configuration for establishing the magnitude of the regulated current. The induction circuit includes a trigger control winding for generating a switching signal, and further includes a no load protection circuit for generating a voltage across the gas discharge tube responsive to the regulated current and for maintaining the output voltage at a predetermined value when the gas discharge tube is decoupled from the electronic ballast system. The no load protection circuit includes a transformer having a primary winding coupled in series relation with the filter circuit and the tapped primary winding of the induction circuit. This transformer includes a multiplicity of secondary windings which includes a center tapped tuned high voltage secondary winding wherein the center tap is capacitively coupled to the power supply reference for providing direct current isolation between the high voltage secondary and the primary winding. The primary winding forms a variable inductance for reducing the regulated current when the gas discharge tube is decoupled from the ballast system. The ballast system also includes switching circuitry which is feedback coupled to the induction circuitry for establishing the regulated current. The switching circuitry includes regulation circuitry for maintaining the power output to the gas discharge tube at predetermined and substantially constant value. The regulation circuitry includes a toroidal transformer having (1) a first winding coupled in series relation between the transformer of the no load protection circuitry and the filter circuitry for generating a feedback signal responsive to the regulated current, and (2) a second winding coupled in series relation with the trigger control winding and the switching circuitry for generating a control signal additive with the switching signal responsive to the feedback signal.

REFERENCE TO RELATED APPLICATIONS

This electronic ballast system is related to the commonly owned U.S. Pat. No. 4,733,135, issued Mar. 22, 1988 entitled "Self-Regulating, No Load Protected Electronic Ballast System".

DESCRIPTION OF THE PREFERRED EMBODIMENTS

Figure 1:
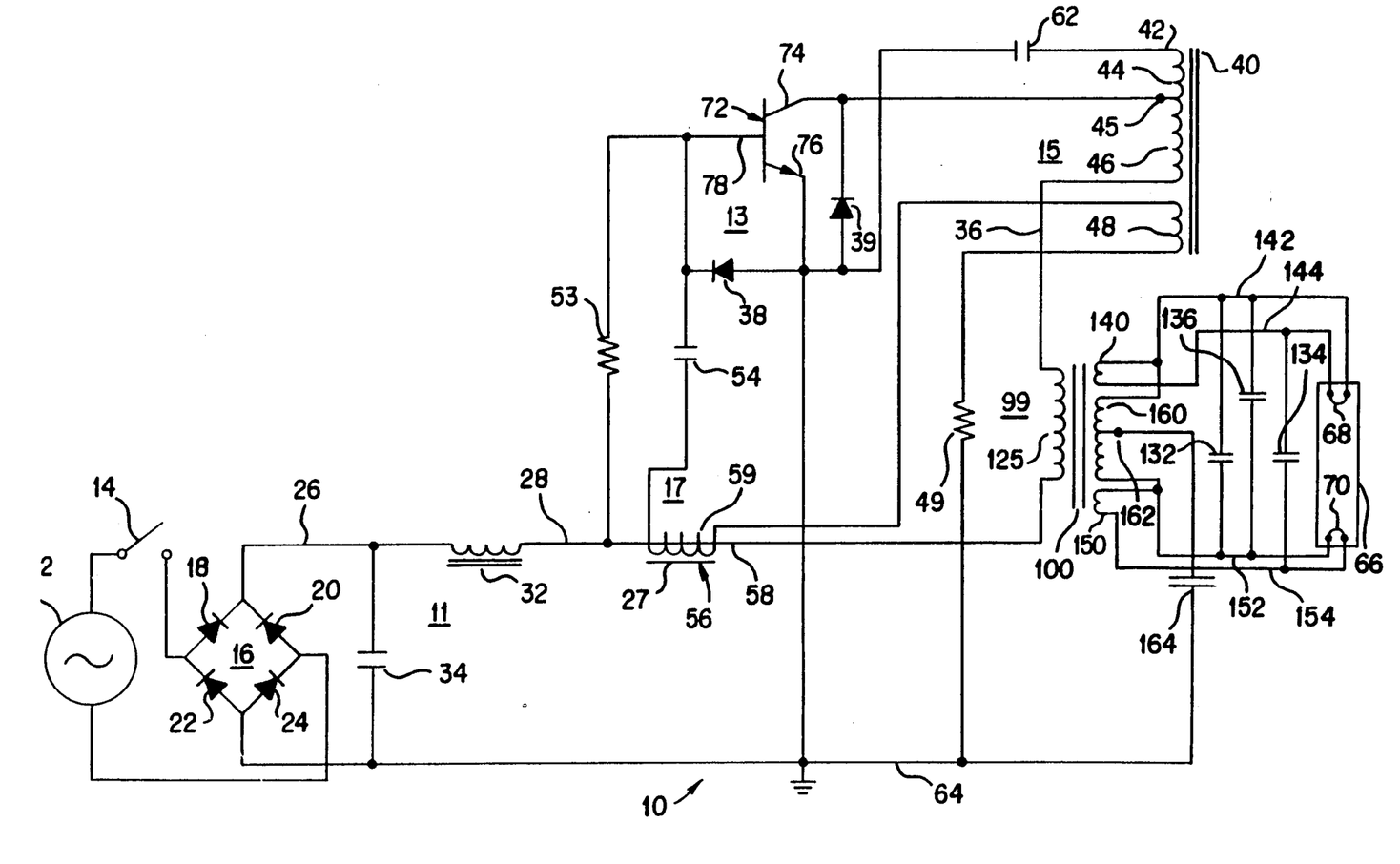
The FIGURE is an electrical schematic diagram of the improved self-regulating, no load protected electronic ballast system.

Referring to the FIGURE, there is shown improved self-regulating, no load protected electronic ballast system 10 having power source 12 for actuation of at least one gas discharge tube 66. Gas discharge tube 66 may be a standard fluorescent type system having first and second filaments 68 and 70, respectively. Self-regulating, no load protected electronic ballast system 10 is provided to maintain the output and input power of gas discharge tube 66 at a predetermined value which is substantially constant during operation and substantially constant and independent of electrical component tolerances from one electronic ballast system 10 to another.

In overall concept, improved self-regulating, no load protected electronic ballast system 10 is provided for maximization of efficiency of light output from gas discharge tube 66 with respect to power input from power source 12. Additionally, improved self-regulating, no load protected electronic ballast system 10 provides substantially constant light output within a narrow tolerance range. The light output of gas discharge tube 66 is maintained at a predetermined level which is insensitive to voltage variations, as the output to the gas discharge tube is responsive to a pulsating driving current, the magnitude of which is regulated. As will be seen in following paragraphs, the output voltage of improved electronic ballast system 10 is limited and substantially reduced when gas discharge tube 66 is electrically removed from the circuit.

Of particular importance, electronic ballast system 10 provides a regulation control 17 which eliminates the need for adjusting or pre-selecting transistors of specific gain, in order to provide a relatively constant light output substantially independent of manufacturing tolerances associated with the manufacture of electronic components which form the ballast system. Additionally, the regulation control circuit 17 limits the maximum output voltage to gas discharge tube 66 in response to voltage increases from power source 12 by maintaining the driving current at a predetermined value.

The output voltage is further controlled by the no load protection circuitry 99 which functions to reduce the output voltage below its normal operating voltage when the gas discharge tube 66 is electrically removed from the circuit, either by its failure or by its physical removal from the system. Load protection circuitry 99 also provides isolation between the regulation control circuitry of ballast system 10 and the high voltage discharge of the gas discharge tube 66.

Additionally, the improved self-regulating, no load protected electronic ballast system 10 provides for a frequency control mechanism using the inductive characteristics of inverter transformer 40 and the tank circuit formed by the center tapped secondary winding 160 of transformer 100 and capacitors 132 and 134. This circuit arrangement for frequency control allows for frequency stabilization with the advantage of permitting electronic ballast system 10 to operate in a normal manner without bothersome visual flickering.

Particularly, operation of the gas discharge tube 66 is maintained at minimum current levels, due to the higher efficiency obtained by improved self-regulating, no load protected electronic ballast system 10, thus improving its life characteristics. Of importance to the reliability of system 10 is the minimumization of electrical components coupled with the simplicity of the circuitry associated with ballast system 10. This concatenation of elements has the effect of increasing reliability of improved self-regulating, no load protected electronic ballast system 10 while simultaneously maximizing the operating lifetime for gas discharge tube 66.

Referring now to the FIGURE, electronic ballast system 10 is coupled to a power source 12 for actuating gas discharge tube 66, such includes rectification circuit 16 coupled to power source 12 for establishing a pulsating direct current voltage signal. The output from rectification circuit 16 is coupled to filter circuit 11 for establishing a substantially smooth direct current voltage signal.

The improved self-regulating, no load protect electronic ballast system 10 further includes induction circuitry 15 which is electrically coupled to filter circuit 11 for establishing the magnitude of a pulsating driving current established by switching network 13. As will be detailed in following paragraphs, induction circuitry 15 includes no load protection circuit 99 for generating a voltage across gas discharge tube 66 responsive to the pulsating driving current, and for maintaining the output voltage at a predetermined value when gas discharge tube 66 is not electrically connected to ballast system 10. Induction circuit 15 is coupled to regulation control circuit 17 for maintaining a gain value of switching network 13 to a predetermined level.

Induction control circuitry 15 also includes a trigger control winding 48 for generating a switching signal. Switching network 13 generates a pulsating driving current responsive to the switching signals generated in trigger control winding 48.

As will be described in following paragraphs, improved no load protection circuit 99 is coupled to filter circuit 11 and includes a center tapped tuned high voltage output secondary winding 160 for generating a limited voltage across gas discharge tube 66 responsive to the regulated driving current.

As shown in the FIGURE, power source 12 provides an electrical power input to the improved self-regulating, no load protected electronic ballast system 10. In the embodiment shown, power source 12 may be an AC power source of standard voltage such as 120, 240, 270 volts, or any acceptable standardized power voltage generated at approximately 50.0 or 60.0 Hz. Broadly, power source 12 may be a DC electrical power source applied internal or external to the improved self-regulating, no load protected electronic ballast system 10 in a manner well known in the art by removal of some elemental circuitry and filtering elements.

For the purpose of illustration, power source 12 will be in the following paragraphs designated as a 110-140 volt, 50.0 Hz, AC power source and will be used in the embodiment to be described.

Power for system 10 is supplied by power source 12 to switch 14 which may be a standard switch element such as a single pole, single throw switch mechanism. Power is applied from switch element 14 to rectification circuit 16, which is used for providing full-wave rectification of the power source AC voltage.

Rectification circuit 16 may be a full-wave bridge circuit well-known and standard in the art. In the embodiment illustrated, full-wave bridge circuit 16 is formed by diode elements 18, 20, 22, and 24 for providing the necessary rectification of the AC voltage from power source 12. Diode elements 18, 20, 22 and 24 may be one of a number of standard diode elements and in one form of improved self-regulating, no load protected electronic ballast system 10, diode elements 18, 20, 22 and 24 have the standardized designation of 1N4005.

Rectification full-wave bridge circuit 16 provides a pulsating DC voltage signal passing out line 26 which is applied to shunt capacitor 34 of filter network 11. Output line 26 is also coupled to choke element 32 for coupling choke element 32 in series relation with rectification circuit 16. Rectification bridge circuit 16 and choke capacitor 13 are coupled to return line 64, which is the return path for the DC supply and thus defines a DC reference.

Filter network 11 thus defines a smoothing filter having a choke element 32 and a shunt capacitor 34. Choke element 32 is coupled on a first end to one end of shunt capacitor 34 and the junction between diode elements 18 and 20 of rectification bridge circuit 16, and on the opposing end to the power supply output line 28. Shunt capacitor 34 is coupled in parallel relation with the output rectification circuit 16 through the output line 26. Shunt capacitor 34 is coupled on a first end to output line 26, thereby being coupled to both choke element 32 and the junction of diode elements 18 and 20 of bridge rectification circuit 16. Shunt capacitor 34 is coupled on the opposing end to DC return line 64.

In combination, shunt capacitor 34 and choke element 32 function to average out the 100 Hz pulsating DC voltage supplied by full-wave bridge circuit 16. Additionally, this combination substantially maintains the current draw at an average value without creating a power factor which is either unacceptably leading, or unacceptably lagging. Deleterious lead or lag may be found wherein a large capacitance is used, or a large inductance, as the sole filtering means for smoothing a pulsating DC voltage.

For purposes of illustration, in the event choke element 32 were not incorporated within improved self-regulating, no load protected electronic ballast system 10, shunt capacitor 34 would draw an increased current commonly referred to as a surge current on each cycle as capacitor 34 began to charge. By incorporation of choke element 32, the inductance stores energy during each half cycle to supply current for initial charging of shunt capacitor 34 which provides a substantially smooth, average current as seen by power source 12.

In the embodiment herein provided, choke element 32 may be an inductor approximately 100 millihenrys, and shunt capacitor 34 is a commonly available 100.0 microfared, 350 volt electrolytic capacitor.

No load protection circuitry 99 is coupled between filter network 11 and induction circuit 15. No load protection circuit 99 includes transformer 100 with primary winding 125 and tuned center tapped high voltage output secondary winding 160 as well as a pair of filament excitation windings 140 and 150. Tuned, high voltage output center tapped secondary winding 160 is coupled in parallel relation with tuning capacitor 132, stabilizing capacitor 136 and the series combination of windings 140, stabilizing capacitor 134 and winding 150 to form a tank circuit for generating the output voltage to gas discharge tube 66. Filament excitation windings 150 and 140 are each coupled to respective gas discharge tube filaments 70 and 68.

In the embodiment herein provided, no load protection circuit 99 is comprised of transformer 100 with the core material being a ferrite composition having the designation of Ferroxcube 3019 with primary winding 125 composed of 36 turns and each half of the tuned center tapped high voltage output secondary winding having 34 turns and each of filament excitation windings 140 and 150 being composed of a single turn each. Transformer 100 has a linear magnetic core which is designed not to saturate during operation of ballast system 10. Tuning capacitor 132 is located in close proximity to transformer 100 and is a 33 nanofared tubular ceramic type capacitor, the value having been selected such that the parallel combination of winding 160 and capacitor 132 provides the desired timing for the circuit, as will be described in following paragraphs.

The stabilizing capacitors 134 and 136 provide filtering of undesirable noise in the output circuit. Capacitors 134 and 136 are ceramic disc type capacitors each having a capacitance value of 1200 picofarads. Capacitors 134 and 136 are located in close proximity to lamp 66 which is substantially separated from transformer 100.

The center tap 162 of tuned winding 160 is capacitively coupled to the DC reference 64 to provide an AC reference for the secondary circuit of transformer 100. To provide this AC reference, coupling capacitor 164 is connected on one end to center tap 162 of winding 160 and on the opposing end to the DC reference 64. This arrangement is particularly important to the operation of electronic ballast system 10 in that radiation of spurious signals from the high frequency, high voltage signal generated in the secondary circuit of transformer 100 is substantially prevented, without undue noise being introduced into the DC supply.

Isolation of the high frequency, high voltage secondary of transformer 100 by allowing it to float would substantially prevent the introduction of noise into the DC supply of ballast system 10. However, the tuned high voltage output of transformer 100 would then become a radiator of electromagnetic interference, which would be unacceptable for coupling with commercial power systems and use in most commercial environments. Alternately, if the center tap was coupled directly to the DC power supply reference, such would substantially eliminate the radiated interference, but would introduce substantial amounts of noise into the DC supply, as a result of current surges having a DC component which occur during conduction of the gas discharge tube. Thus, by providing an AC coupling to the power supply reference 64 through capacitor 164 the radiation of the high frequency signal is prevented and the DC current surges are isolated from the primary side of transformer 100.

Self-regulation control circuit 17 is coupled between filter circuit 11 and no load protection circuit 99. Self-regulation control circuit 17 includes base coupling capacitor 54, toroid transformer 56 and current limiting resistor 49. Current limiting resistor 49 is coupled in series relation with trigger control winding 48 of inverter transformer 40, being coupled on a first end to trigger control winding 48 and on the opposing end to DC supply reference 64. First winding 58 of toroid transformer 56 is coupled in series relation with power supply output line 28 and primary winding 125 of transformer 100. First winding 58 is a single turn formed by the DC power supply output line 28 passing through the axis of the toroid core.

Second winding 59 of toroid transformer 56 is coupled on a first end to base coupling capacitor 54 and on the opposing end to trigger control winding 48 of transformer 40. Base coupling capacitor 54 being coupled on one end to second winding 59 of toroid transformer 56 and on the opposing end to the base 78 of transistor 72.

In one working embodiment, toroid transformer 56 may have a ferrite core material composition which is commercially available from Feroxcube having the designation 266T125-4C4, with first winding 58 having one turn, and second winding 59 having twenty turns. Current limiting resistor 49 having a resistance value of 470 Ohms and base coupling capacitor 54 being a 0.01 microfared, 110 volt Mylar-type capacitor. The series combination of second winding 59 of toroid transformer 56, and base coupling capacitor 54 provides a path for the base drive signal of switching network 13 once ballast system 10 goes into an oscillation phase.

Improved self-regulating, no load protected electronic ballast system 10 further includes switching network 13 which is feedback coupled to induction circuitry 15 for establishment of a pulsating current. As will be seen in following paragraphs, switching network 13 includes a regulation mechanism for maintaining the power output of gas discharge tube 66 at a predetermined and substantially constant value.

Switching network 13 includes transistor 72 connected in feedback relation to trigger control winding 48 of inverter transformer 40 through second winding 59 of toroid transformer 56.

This coupling arrangement allows switching of a current signal responsive to a bias signal produced in combination with a feedback signal from toroid transformer second winding 59.

Referring to trigger control winding 48 of inverter transformer 40, a current signal induced in trigger control winding 48 passes through winding 48 to toroid transformer second winding 59 for combination with a feedback control signal. The current then passes from toroidal transformer second winding 59 to base coupling capacitor 54 for providing a pulse input to the base 78 of transistor 72. The base current circuit is completed by coupling of the emitter 76 of transistor 72 to power supply reference 64, and current limiting resistor 49 being coupled to the power supply reference 64.

Transistor 72 includes respectively base element 78, collector element 74, and emitter element 76. Transistor 72 may be of an NPN type which is commercially available, and in one commercially purchased transistor, has a designation of MJE16005.

It is of particular importance that toroidal transformer first winding 58 precedes primary winding 125 of transformer 100 in the driving current flow path. The driving current subsequent to passing through primary winding 125 of transformer 100 has been found to include noise pulses induced from the gas discharge tube operation. These noise pulses would interfere with the regulation control of toroid transformer 56 if its position did not precede winding 125. Thus, although the pulsating collector current is the same for each of the series coupled elements, the superimposed noise reflected from the secondary circuit of no load protection circuit 99 to the primary winding 125 passes only to induction circuit 15 and transistor 72 before being coupled to the power supply reference 64. Thus, by coupling self-regulating control circuit 17 between the power supply output line 28 and no load protection circuit 99 a much more accurate and stable control of transistor base current responsive to the driving current is achieved, as compared to prior art systems.

Improved self-regulating, no load protected electronic ballast system 10 is designed to provide a consistency in visual light output, as well as power input to gas discharge tube 66 by maintaining the current of collector element 74 substantially constant, and substantially independent of current gain of a particular transistor 72 used in electronic ballast system 10.

It has been determined that the light output should not fluctuate more than ±3.0%, while the current gain of transistor 72 used in this system 10 may vary in the extreme between 10 and 60. It should be understood, that although system 10 is shown in the illustrated embodiment operating a single discharge tube 66, the principles as herein described are general in concept and may be used in dual systems, and in those cases the transistor current gains would not necessarily have to be matched by pairs to provide a proper oscillating system.

Initially when switch 14 is first closed, a positive voltage provided to base element 78 by resistor 53 assures a small but sufficiently initiating current flow through base element 78 for initiation of conduction through transistor 72. A value of 1.0 megohms has been used successfully for resistor 53 in one working embodiment.

When transistor 72 goes into a conducting or "on" state, current from power source 12 flows through bridge circuit 16, choke 32 to DC output line 28. From DC output line 28 current flows through first winding 58 of toroidal transformer 56 through primary winding 125 of transformer 100 to primary winding 42 of inverter transformer 40. Such current passes through first section 46 of primary winding 42 to tap line 45 which is coupled to collector element 74 of switching transistor 72.

Current flows through transistor 72 from collector 74 to emitter 76 and then from emitter element 76 through return line 64. The increase in collector current established by switching transistor 72, as transistor 72 is switched from a "off" condition into conduction, induces a voltage in bias control winding 48 which is coupled to base element 78 of transistor 72 through toroidal transformer second winding 59 and base coupling capacitor 54. Base current flows from base element 78 to emitter element 76 in transistor 72 and from emitter element 78 to return line 64. The series combination of the elements as aforementioned, creates a pulse type base drive for switching transistor 72 from an "on" state to an "off" state after a predetermined period of time. In completion of the circuit, the current flows from return line 64 through current limiting resistor 49 back to trigger control winding 48.

The pulse which drives switching transistor 72 controls the duration of the "on" time during the frequency of operation of improved self-regulating, no load protected electronic ballast system 10. At the terminating point of this pulse, transistor 72 goes to an "off" state and the pulse differentiation through capacitor 54 supplies a negative signal to base element 78 which is limited in value magnitude by base protection diode 38. The energy stored in inverter transformer 40 is discharged from primary winding 42 to capacitor 62 and therethrough to return line 64.

Concurrently, as the collector current passes through the primary winding 125 of transformer 100, a voltage is induced in each of transformer 100 secondary windings. The voltage induced in filament excitation windings 140 and 150 causes a current to flow through filaments 68 and 70 of gas discharge tube 66, respectively.

The voltage induced in tuned center tapped high voltage output secondary winding 160 is additively coupled to the filament excitation voltage and applied across the tuning capacitor 132 and capacitors 134 and 136, and across gas discharge tube 66. The voltage induced at this point in the cycle is sufficient to maintain the discharge within gas discharge tube 66 but not sufficient to initiate the discharge itself.

The increasing collector current as the transistor 72 is first switched "on" causes the magnetic field in the ferrite magnetic core of transformer 40 to increase from substantially zero to a predetermined value of magnetic induction, "B", on the hysteresis cycle in a manner such that the circuit operates in a linear region of the characteristic. The change in magnetic field induces a voltage in the windings surrounding the magnetic core of transformer 40 proportional to the number of turns of each particular winding. The windings are coupled in a manner to enhance the positive voltage applied to the base 78 which reinforces the increase in current flow in the loop comprising collector 74, emitter 76 and all the elements in series coupling therewith, until the current reaches a maximum value determined by the impedance of first section 46 and the voltage level from line 36, coupling primary winding 125 to primary winding first section 46.

When the current in the path of collector 74 and the emitter 76 cease to increase, the magnetic induction having reached the predetermined value "B" abruptly collapses and induces a voltage of opposite polarity in the base drive winding 48, which terminates the flow through collector 74 and emitter 76. To prevent a damaging negative voltage from being applied to collector 74 of transistor 72, a collector protection diode is coupled in parallel relation between collector 74 and emitter 76 of transistor 72 in a manner well known in the art.

At this time, the induced voltages are large and classically are equal to the inductance sum multiplied by the differential of the current flowing with respect to time. The inductance sum is the sum of the inductances of transformer primary winding 125, primary winding first section 46, primary winding second section 44, and twice the mutual inductance between sections 46 and 44. This results in a frequency of discharge equal to 1 divided by 2 times the square root of the sum of the inductances multiplied by the capacitance of capacitor 62.

The discharge current assumes a sinusoidal shape dependent on the inverse of the frequency of discharge which is the "off" time and is the time taken to discharge the energy stored during the "on" time, namely one-half the inductance sum multiplied by the current squared. Once again, an abrupt fall in the magnetic induction is provided with the direction of the current opposite in direction to that portion of the sine wave. The substantially instantaneous voltages and currents are large enough to induce the starting voltages either positive or negative in center tapped winding 160.

The magnitude of the voltage across winding 160 of transformer 100 is equal to the mutual inductance between primary winding 125 and winding 160 multiplied by the current flow through the winding 125 and 2 times the discharge frequency.

It is to be understood that the electromotive forces across windings 125 and 160 of transformer 100 are opposite in phase and current flowing in windings 140, 150 as well as 160 are such that it opposes the changes in magnetic flux in primary winding 125. This has the effect of reducing the impedance of primary winding 125 and allows a larger current to flow in the loop inducing such. Thus, when a current flows in any secondary winding, the current in primary winding 125 increases. When discharge tube 66 is removed from the circuit, there is substantially no current flow in windings 140, 150 or 160 and the impedance of primary winding 125 increases, and thereby substantially reduces the current flow in the circuit loop including primary winding 125, primary winding first section 46 of transformer 40 and transistor 72.

Switching network 13 further includes base protection diode 38 which is coupled in parallel relation to the base emitter junction of transistor 72 with its cathode coupled to the base 78 to prevent negative voltages from damaging transistor 72. Similarly, collector protection diode 39 is coupled in parallel relation with the collector emitter junction of transistor 72 with the cathode of diode 39 being coupled to the collector 74 of transistor 72. Base protection diode 38 may be a commercially available 1N4005 type diode and collector protection diode 39 may be a commercially available 1N4937 type diode.

Primary winding 42 of inverter transformer 40 is a tapped winding which is connected in an autotransformer configuration such that the voltage induced in primary winding second section 44 is coupled in series relation and adds to the voltage across primary winding first section 46.

The total voltage across primary winding 42 is coupled to capacitor 62 which is connected in series relation with primary winding 42. Obviously, as seen in the FIGURE, capacitor 62 is coupled on a first end to primary winding 42 of inverter transformer 40 and is further coupled on a second end to return line 64. For purposes of the embodiment herein described, capacitor 62 may be a 6 nanofarad, 1.0 kilovolt Mylar capacitor; for discharging, during the "off" cycle of transistor 72, energy stored in inverter transformer 40 during the "on" cycle of transistor 72.

Primary winding 125 of no load protection transformer 100, as previously described, is one element in the series combination of elements through which the collector current of transistor 72 flows. Thus, the magnitude of the current in each of those elements is identical and the maximum value for the current is equal to the DC supply voltage on the output line 28 divided by the sum of the series impedances in the current path.

The impedance of primary winding 125 of transformer 100 is a function of the impedance of the winding itself and the impedance which is reflected from the secondary windings. When the tuned center tapped high voltage output secondary winding 160 is loaded, the resulting impedance of primary winding 125 is at a minimum value. The filament excitation windings 140 and 150 have a negligible effect on the reflected impedance, since each is composed of only one turn. With the impedance of primary winding 125 at its minimum value, the collector current is therefore at its maximum, assuming the DC supply voltage on line 36 is at least at its designed minimum operating value.

When the gas discharge tube 66 is no longer connected to electronic ballast system 10, the resulting reflected impedance of tuned center tapped high voltage secondary winding 160 in the primary winding 125 becomes very high. The now high series impedance of primary winding 125 causes the collector current to be proportionately reduced. Thus, the energy stored in transformer 100 is likewise proportionately reduced and the resulting voltage across the output terminals of winding 160 will be reduced as well.

Primary winding 125 of no load protection transformer 100 therefore functions as a variable impedance which is inversely proportional to the load seen on the secondary winding 160 of transformer 100. Since the impedance of primary winding 125 is substantially all inductive, there is very little dissipation in the form of heat in primary winding 125 to affect the efficiency or component life of electronic ballast system 10.

Referring still to the FIGURE of improved self-regulating, no load protected electronic ballast system 10, it is seen that when the system is in oscillation and transistor 72 is in an "on" state, the collector current which is the system driving current flows from power source 12 through rectification circuit 16 and filter network 11, through toroidal transformer 56 from DC output line 28 to primary winding 125 of transformer 100.

The driving current flows through primary winding 125 of transformer 100 to line 36, and then through primary winding first section 46 of induction transformer 40 to tap line 45 where it is coupled to collector element 74 of switching transistor 72. Transistor 72 being in an "on" state allows current to pass from collector element 74 to emitter element 76 and back to the return of the power supply through line 64. This current being of an increasing nature, induces a voltage in bias control winding 48 which is wound in a direction to produce a voltage on base element 78 of transistor 72 which is positive with respect to emitter element 76 and greater than approximately 0.7 volts, which is required to keep transistor 72 in an "on" state. Thus, the voltage produced in bias control winding 48 reinforces the "on" condition of transistor 72 as long as the driving current is increasing.

The collector current increases in a substantially linear manner until a maximum value is reached. The maximum value is a function of the power supply voltage and the impedance of the collector circuit, as has been previously described. Thus, when the collector current flows through first section 46 of primary winding 42, during the transistor "on" state, a magnetic flux is generated within the core of inverter transformer 40 which induces the voltage in secondary winding 48 reinforcing the "on" condition and provides base drive current. The same driving current also flowing through primary winding 125 of transformer 100 generates a magnetic flux within the core of transformer 100 which induces the voltages in all of the secondary windings of no load protection transformer 100.

The induced voltages in secondary windings 140 and 150 provide the heater current for respective filaments 68 and 70 of gas discharge tube 66. The voltage induced in the tuned high voltage output tapped secondary winding 160 is coupled from the parallel connected tuning capacitor 132 to stabilizing capacitor 136 by filament coupling leads 142 and 152 and to stabilizing capacitor 134 by filament coupling leads 144 and 154. The leads 142 and 144 being coupled to lamp filament 68, and leads 152 and 154 being coupled to lamp filament 70. The tapped secondary high voltage winding 160 is thereby coupled to gas discharge tube 66 for generation of visible light output from gas discharge tube 66.

The induced voltage in second section 44 of primary winding 42 of inverter transformer 40 being monopolar only charges capacitor 62 during this portion of the cycle.

When transistor 72 is turned to an "off" state, the collector current which was flowing through first section 46 of inverter transformer primary winding 42 and primary winding 125 of no load protection transformer 100 terminates abruptly. The rapid change in collector current induces voltages again in second section 44 of inverter transformer primary winding 42 and secondary winding 48, as well as secondary windings 150, 140 and 160 of transformer 100. As is known from classical theory, the polarity of the voltages induced by the rapid collapse of the collector current is such that transformer 40 and transformer 100 attempt to maintain the direction of the original current in the respective primary windings 46 and 125. To maintain the direction of current flow in windings 46 and 48 of induction transformer 40, the voltage induced in bias control winding 48 is of opposite polarity to that described when the collector current was flowing. Thus, a negative signal on base element 78 with respect to emitter 76 is generated to reinforce the "off" condition of transistor 72.

As has been previously described, this allows for a repetitive cycle with a collector current wave form which ideally would be a square wave. However, due to the gap in the magnetic circuit, which slows down changes in the value of "B" with respect to current and results in an inclined rectangularly shaped hysteresis loop, the rise and fall of the collector current has a predetermined slope.

The frequency of oscillation is determined by the time period for the transistor "on" coupled with the time period of the transistor "off" cycles. The time period for the "on" period is determined by the characteristics of the core of transformer 40, the number of turns on first section 46 of primary winding 42, and the current flowing through first section 46 of primary winding 42. In particular, the "on" time is equal to twice the value of "B" times the transformer turns, times the core area divided by the voltage from output line 28, all being multiplied by $10^{-8}$. The time period for the "off" cycle of transistor 72 is controlled by the resonant frequency of the inductance of tapped secondary winding 160 of transformer 100 and the capacitance value of capacitor 132, the inductance of windings 140 and 150, and the capacitance of capacitors 134 and 136 being sufficiently small to be considered insignificant.

Thus, the frequency of oscillation is controlled by the sum of the time periods for the "on" and "off" cycles, making the oscillation frequency much less dependent on supply voltage than that which is known in the prior art, and produces a visible light output from gas discharge tube 66 which is substantially constant and having a minimization of visual flicker, even when there exists substantially large variations in supply voltage.

As was previously described, when gas discharge tube 66 is electrically removed from the circuit, the driving current is reduced to limit the high voltage output from electronic ballast system 10. The reduced load seen by tuned high voltage output center tapped secondary winding 160 is reflected as an increase in impedance of primary winding 125 of transformer 100, which in turn reduces the collector current and the resulting induced voltage during each of the half cycles of electronic ballast system 10 operation.

The center tap 162 of winding 160 being capacitively coupled to the power supply reference 64 by capacitor 164 provides an AC coupling to substantially prevent electromagnetic radiation from being radiated by the secondary circuit of no load protection circuit 99 while substantially limiting the coupling of noise from the secondary circuit to the primary circuit.

In one working embodiment of improved self-regulating, no load protected electronic ballast system 10, inverter transformer 40 has a ferrite core using Feroxcube 3019 with a 0.24 mm gap to reduce the likelihood that inverter transformer 40 will go into a saturating mode. Primary winding 42 is formed of one hundred and five turns with the tap 45 being located to provide a first section 46 of seventy turns and a second section 44 having thirty-five turns, and the secondary winding 48 is composed of a single turn.

It is of importance to maintain a relatively uniform gain of transistors in electronic ballast systems in order that light output may be maintained relatively constant from one particular unit to another within a range of approximately ±3.0%.

However, due to normal manufacturing techniques known in the industry, the gain of transistors 72 may vary from 10.0 to 50.0 or greater. Thus, a self-regulating control is a requirement as an advantage over having to manually adjust the gain control elements or in the alternative, to pre-select devices within a small tolerance, in order to obtain an output of light which is relatively constant from one electronic ballast system 10 to another.

Improved self-regulating, no load protected electronic ballast system 10 makes use of the concept of a variable inductance in the form of toroidal core 27 wound with twenty turns through which the base current passes. Line 28 passes through the axis of the toroidal core 27 which carries the collector current of transistor 72, free of noise which is superimposed on the collector current subsequent to flowing through primary winding 125 of transformer 100. The direction in which current flows through the two windings is such that the respective magnetic fields are additive within toroidal core 27 of toroidal transformer 56.

Therefore, the inductance which is seen in second winding 59 of toroidal transformer 56 is a function of both the base current and the collector current multiplied by the respective turns ratios and the permeability of magnetic core 27.

In actual practice, the inductance variation of first winding 58 of toroidal transformer 56 may be neglected since first winding 58 is formed by only a single turn and winding 58 inductance is relatively low when compared to the series inductances of primary winding 125 of transformer 100 and first section 46 of primary winding 42 of transformer 40. The inductance of first winding 58 has been found not to be significant when compared to the inductance of these other windings which are substantially larger in absolute value.

In order to insure operation within improved selfregulating, no load protected electronic ballast system 10 of switching transistor 72, trigger control winding 48 is specifically designed to supply sufficient voltage to turn "on" transistor 72 of the lowest gain which would be expected to be obtained from the manufacture of these devices. In this manner, it is assured that transistor 72 will go to an "on" state and reach saturation and thus, the voltage applied to the base with respect to the emitter will be at least 0.7 volts, required to switch transistor 72 to the saturation state.

Regardless of the gain of transistor 72 used in improved self-regulating, no load protected electronic ballast system 10, the collector voltage and collector circuit impedance is substantially the same and thus, the substantially same collector current will flow whether the transistor with a gain of 10 or 50 is being utilized. Therefore, since the base current is a function of the collector current divided by the gain of transistor 72, it is seen that the base current must change if a transistor 72 of a different gain value is to be used and function properly in improved selfregulating, no load protected electronic ballast system 10. This base current change takes place as a result of a change in impedance value for the self-regulating circuit 17, particularly the second winding 59 of toroidal transformer 56.

In order to achieve self-regulation, the design of toroidal transformer 56 is such that the maximum permeability of core 27 is reached with a transistor whose gain is at a maximum expected value. Likewise, the inductance of second winding 59 of toroidal transformer 56 will therefore be at a maximum and hence a minimum current will flow through the base circuit of transistor 72 for transistors of maximum gain.

Thus, the second winding 59 of toroidal transformer 56 being at a maximum value of inductance, its impedance is significantly larger than the impedance of the base coupling capacitor 54 or the current limiting resistor 49, such that it is the controlling factor in limiting the current to base element 78 of transistor 72. With transistor 72 being a maximum gain value, little current is needed, and for example, if the gain or beta of transistor 72 is 50.0, then it is seen that the base current is one-fiftieth of the collector current.

However, the voltage induced in base drive winding 48 has been designed to turn "on" a transistor of lowest gain, and therefore there is excess energy to be dissipated in the base circuit of transistor 72. The excess energy is stored in second winding 59 of toroidal transformer 56. This impedance of second winding 59 is primarily inductive as opposed to resistive, and there is little dissipation in the form of heat, and thus there is provided an efficient means of dissipating the excess energy which is liberated when transistor 72 is in an "off" state.

In the alternative, when a transistor of low gain is used in improved self-regulating, no load protected electronic ballast system 10, the base current obviously must increase and the permeability of core 27 of toroidal transformer 56 shifts in a downward direction to a lower value than would be measured for a high gain transistor, and the inductance is also less than was seen with the high gain transistor. Thus, the series impedance is reduced which allows a greater base current to flow and compensates for the low gain transistor 72 being used in system 10. With toroidal transformer 56 being located between DC output line 28 and primary winding 125 of transistor 100 the collector current monitored by first winding 58 is a smooth signal without noise superimposed thereon which would otherwise cause self-regulating circuit 17 to adjust the base current responsive to the summation of both the noise signal and the collector current.

Hence, there is provided a variable inductance in second winding 59 of toroidal transformer 56 which is essentially the self-regulating element and allows sufficient base current to switch transistor 72 to a "on" state regardless of the gain or beta of transistor 72. In this manner, the output of improved self-regulating, no load protected electronic ballast system 10 remains relatively constant within the predetermined margin when comparing one system to another, with high efficiency and without unnecessary dissipation of excess heat. As has hereinbefore been described, there is provided a relatively simple and efficient means of self-regulation and no load protection for electronic ballast system 10 without the need to manually adjust component values for pre-selected electronic transistor devices within specific gain values.

Further, with tuned no load protection transformer 100 being coupled to induction circuit 15 the prevention of generation of voltages above a predetermined value when gas discharge tube 66 is electrically removed from the circuit is achieved. Primary winding 125 of tuned no load protection transformer 100 forms a variable inductance whose impedance is inversely proportional to the magnitude of the power delivered to gas discharge tube 66.

The variable impedance seen in primary winding 125 is a function of the impedance reflected from the tuned high voltage output center tapped winding 160. The impedance being a function of the number of turns in winding 160, the parallel capacitance of tuning capacitor 132, the magnetic circuit length in the core of transformer 100, and the current in secondary winding 160 which is the load current of gas discharge tube 166. Therefore, a change in load current as seen when the gas discharge tube 66 is no longer in the circuit, effects the impedance of winding 160 and is reflected into the impedance of primary winding 125.

By creating a variable inductance whose impedance is inversely proportional to the load current, a limited voltage can be generated by control of the collector current responsive to load conditions. Further, by providing a center tapped high voltage output secondary winding 160 wherein the center tap 162 is provided with an AC reference to ground, spurious radiation from the high frequency output is substantially prevented and DC current surges, which occur during the discharge through lamp 66, are substantially isolated from the primary circuit.

Although this invention has been described in connection with specific forms and embodiments thereof, it will be appreciated that various modifications other than those discussed above may be resorted to without departing from the spirit or scope of the invention, for example, equivalent elements may be substituted for those specifically shown and described, certain features may be used independently of other features, and in certain cases, particular location of elements may be reversed or interposed, all without departing from the spirit or scope of the invention as defined in the appended claims.

What is claimed is:

1. An improved self-regulating, no load protected electronic ballast system for use with at least one gas discharge tube having a pair of filaments, said ballast having a power source coupled to a filter circuit for supplying a smooth direct current voltage signal to switching means for establishing a driving current, and induction means having a trigger control winding for generating a switching signal and a means for no-load protection coupled to said gas discharge tube for transforming said driving current to a load current applied to said gas discharge tube, said switching means being feedback coupled to said induction means for establishing said driving current responsive to said switching signal, the improvement comprising:

means for regulating power to said gas discharge tube coupled between said filter circuit and said means for no-load protection, said means for regulating including a transformer having (1) a toroidal core, (2) a first winding having one end coupled in series relation with said means for no-load protection and an opposing end coupled to an output of said filter circuit for generating a feedback signal responsive to said driving current, and (3) a second winding coupled in series relation with said trigger control winding and said switching means for generating a control signal additive with said feedback signal within said toroidal core, whereby an impedance value of said second winding is varied to adjust a magnitude for said switching signal for regulation of said switching means to provide a driving current of predetermined value independent of a gain value of said switching means.

2. The improved ballast system as recited in claim 1 wherein said means for no-load protection includes a transformer having a primary winding coupled on one end to said first winding of said toroidal transformer and on the opposing end to one end of a taped winding of said induction means, said tapped winding having a tap coupled to said switching means.

3. The improved ballast system as recited in claim 2 wherein said no load protection transformer includes a tuned secondary winding having a center tap coupled to said power supply.

4. The improved ballast system as recited in claim 3 wherein said center tap is capacitively coupled to said power source to provide direct current isolation between said tuned secondary winding and said primary winding of said no load protection transformer.

5. The improved ballast system as recited in claim 3 wherein said tuned secondary winding is tuned by a capacitor coupled in parallel relation with said tuned secondary winding.

6. The improved ballast system as recited in claim 3 wherein said tuned secondary winding is coupled on opposing ends to one of said pair of filaments to form a parallel coupling with said gas discharge tube.

7. A self-regulating, no load protected electronic ballast system having a power source for actuating at least one gas discharge tube with a regulated current and limited voltage to maintain said gas discharge tube input and output power at predetermined values, comprising:
   (a) filter means connected to said power source for maintaining at an output a substantially smooth direct current voltage signal relative to a power supply reference;
   (b) induction means coupled to said filter means and having a tapped primary winding providing an auto-transformer configuration for establishing the magnitude of said regulated current, said induction means having a trigger control winding for generating a switching signal, said induction means further including no-load protection means for generating a voltage across said gas discharge tube responsive to said regulated current and for maintaining said output voltage at a predetermined value when said gas discharge tube is decoupled from said electronic ballast system, said no-load protection means having a transformer with a primary winding coupled in series relation with said filter means and said tapped primary winding of said induction means, said transformer including a multiplicity of secondary windings, said multiplicity of secondary windings includes a center tapped tuned high voltage secondary winding wherein said center tap is capacitively coupled to said power supply reference for providing direct current isolation between said high voltage secondary and said primary winding, said primary winding forming a variable inductance for reducing said regulated current when said gas discharge tube is decoupled from said ballast system;
   (c) switching means being feedback coupled to said induction means for establishing said regulated current, said switching means including regulation means for maintaining said power output of said gas discharge tube at a predetermined and substantially constant value, said regulation means including a toroidal transformer having (1) a first winding having one end coupled to said primary winding of said no-load protection means and an opposing end coupled to said output of said filter means for generating a feedback signal responsive to said regulated current, and (2) a second winding coupled in series relation with said trigger control winding and said switching means for generating a control signal additive with said switching signal responsive to said feedback signal.

8. The self-regulating, no load protected electronic ballast system as recited in claim 7 where said multiplicity of secondary windings further includes a pair of filament excitation windings, each of said filament excitation windings being coupled to a respective filament of said gas discharge tube.

9. The self-regulating, no load protected electronic ballast system as recited in claim 8 where said tuned high voltage secondary winding is coupled in parallel relation to said gas discharge tube, said tuned high voltage secondary winding generating said limited voltage for input to said gas discharge tube, said limited voltage being reduced responsive to a reduction in said regulated current when said gas discharge tube is decoupled from said electronic ballast system.

10. The self-regulating, no load protected electronic ballast system as recited in claim 9 where said tuned high voltage secondary winding is tuned by a first capacitor coupled in parallel relation therewith, and a pair of second capacitors coupled in parallel relation with said gas discharge tube.

11. The self-regulating, no load protected electronic ballast system as recited in claim 10 where each of said second capacitors is coupled between one lead from each of said filaments.

12. The self-regulating, no load protected electronic ballast system as recited in claim 7 where said switching means includes transistor means for cycling said regulated current, said transistor means including a base element coupled to said second winding of said toroidal transformer, a collector element coupled to said tap of said tapped primary winding of said induction means, and an emitter element coupled to said power source.

13. The self-regulating, no load protected electronic ballast system as recited in claim 12 where said switching means further includes diode protection means coupled between (1) said base element and said power source, and (2) said collector element and said power source for protecting said transistor means from reverse bias potentials above a predetermined value.

14. The self-regulating, no load protected electronic ballast system as recited in claim 13 where said regulation means includes a base coupling capacitor connected on opposing ends thereof to said second winding of said toroidal transformer and said base element for substantially blocking a direct current component signal.

15. The self-regulating, no load protected electronic ballast system as recited in claim 7 where said regulation means includes a current limiting resistor coupled on opposing ends thereof with said power source and said trigger control winding in series relation therewith.

16. The self-regulating, no load protected electronic ballast system as recited in claim 7 where said filter means includes an inductor coupled in series relation to said power source and said first winding of said toroidal transformer.

17. A no load over voltage protection circuit including a tuned transformer series coupled to a current driven inverter circuit for preventing the generation of voltages above a predetermined value, said current driven inverter having a transformer through which inverter current is switched to deliver power to a load, said tuned transformer having a primary winding and at least one center tapped secondary winding, said tap being capacitively coupled to a power supply reference for (1) substantially preventing radiation of a high frequency noise signal, and (2) providing direct current isolation between said center tapped secondary winding and said primary winding, said primary winding being series coupled to said inverter circuit transformer through which said inverter current is switched, said primary winding forms a variable inductance which is inversely proportional to the magnitude of said power delivered to said load.

18. The no load over voltage protection circuit as recited in claim 17 where said center tapped secondary winding includes a tuning capacitor forming a parallel inductive-capacitive tank circuit for generating said power delivered to said load responsive to said switched inverter current.

19. The no load over voltage protection circuit as recited in claim 18 where said tank circuit is coupled in parallel relation to said load for coupling said generated power to said load, said load forming part of a complex impedance in combination with said tank circuit.

20. The no load over voltage protection circuit as recited in claim 19 where said complex impedance is reflected in said primary winding of said tuned transformer for control of said switched inverter current by said variable inductance of said primary winding.

* * * * *